3,147,224
FINISH REMOVER COMPOSITION
Wayne M. Gauntt, Los Angeles, Calif., and Neil W. Berst, Evanston, and Eugene F. Maisel, Chicago, Ill., assignors to The Diversey Corporation, Chicago, Ill., a corporation of Illinois
No Drawing. Filed Nov. 4, 1958, Ser. No. 771,727
1 Claim. (Cl. 252—143)

This invention relates to improved compositions for removing coatings from surfaces. More specifically, this invention relates to compositions for removing finish coatings such as paints, enamels, varnishes, lacquers and resins from coated surfaces. These compositions may be used for stripping such coatings from metal, wood, ceramic material, and the like.

Although the finish remover formulations hitherto known have in general been satisfactory for use in removing surface coatings of the common varieties of paint, varnish, an enamel, recent advances in the organic coating industries have led to the development of new surface coatings having greater adhesion and greater resistance to softening and removal by the solvents commonly used for this purpose.

Most modern finish removers incorporate a chlorinated hydrocarbon as the principal solvent for softening and loosening the finish in order to permit its removal. These chlorinated hydrocarbons, a particularly preferred example of which is methylene chloride, do not have the dangerous flammability of the older solvents such as acetone, benzene, and petroleum naphtha and are therefore particularly desirable for this use.

It has been discovered that the stripping ability of finish remover compositions in which methylene chloride is used as the principal stripping agent is greatly increased by the presence of monomethyl acid orthophosphate. This compound, used in an amount of from about 0.1% to about 20%, and preferably from about 0.5% to about 5%, by weight of the total composition, unexpectedly improves the stripping ability of the methylene chloride to such an extent that the removal of coatings which formerly could be accomplished, if at all, only with great difficulty using known paint strippers, now becomes a practical matter.

The activating effect of monomethyl acid orthophosphate on the stripping ability of methylene chloride in removing various modern surface finishes is demonstrated by the data in Table I. These data were obtained by tests carried out using mild steel panels which were given a preliminary cleaning in a solvent emulsion type cleaner, rinsed, phosphatized with an amorphous iron phosphate type of spray coating, rinsed, dried, and coated with each of several different types of commercially available modern finishes. The manufacturer's directions for applying and curing the finish were followed in each case. The panel was then placed in a container and covered with the finish remover. The time required for the bond between the metal and the finish to become sufficiently loosened to permit flushing off the finish with running tap water was noted. As standards for comparison, the same tests were performed using methylene chloride alone and methylene chloride containing a small amount of methanol which functions as a cosolvent to improve the homogeneity of formulations comprising methylene chloride and other ingredients.

Table 1

| Finish remover | Composition, wt. percent | Surface coating removal | | | | | | | |
|---|---|---|---|---|---|---|---|---|---|
| | | Baked phenolic (200° F., 20 min.) | | Baked Epon catalyzed with primer (250° F., 10 min.) | | Epon urea (baked 350° F., 20 min.) | | Polyvinyl butyrate (air dried) | |
| | | Time, min. | Removal, percent | Time, min. | Removal, percent | Time, min. | Removal, percent | Time, min. | Removal, percent |
| 1 | Methylene chloride, 100 | 180 | 0 | 120 | 0 | 60 | 0 | 70 | 0 |
| 2 | Methylene chloride, 96.0; monomethyl acid orthophosphate, 4.0. | 180 | 0 | 25 | 100 | 6 | 100 | 180 | 100 |
| 3 | Methylene chloride, 89.4; methanol, 10.6. | 180 | 0 | 180 | 0 | 180 | 0 | 180 | 0 |
| 4 | Methylene chloride, 86.0; methanol, 10.2; monomethyl acid orthophosphate, 3.8. | 14 | 100 | 4 | 100 | 6 | 100 | 25 | 100 |

As the above data clearly demonstrates, the addition of monomethyl acid orthophosphate greatly improves the stripping efficiency of methylene chloride even in the absence of an additional ingredient (methanol, for example) which serves the function of a cosolvent (compare Remover 1 with Remover 2 in Table I). However, since monomethyl acid orthophosphate is only very slightly soluble in methylene chloride, it is preferred to add to the finish remover a cosolvent which brings about the dissolution of the phosphate in methylene chloride. A preferred example of such a cosolvent is methanol, which, as shown in Table I, improves the effect of the monomethyl acid orthophosphate on the stripping ability of methylene chloride (compare Remover 2 with Remover 4).

In addition to methanol, there may be used as cosolvents other aliphatic alcohols such as ethanol, hexanol, decanol, and the like; glycols, such as ethylene glycol, diethylene glycol, triethylene glycol and the like; aliphatic ether alcohols, such as ethylene glycol monomethyl ether, ethylene glycol monoethyl ether, ethylene glycol dimethyl ether, diethylene glycol monoethyl ether, diethylene glycol dimethyl ether and the like; esters, such as ethyl acetate; and well-known solvents such as acetone, dioxane, and petroleum ether. Other suitable cosolvents will be apparent to those skilled in the art. The cosolvent is generally used in an amount of at least about 1% and preferably from about 5% to about 40% by weight of the total composition.

Concentrations of cosolvent much above about 40% are not preferred because of a marked decrease in stripping efficiency resulting from the lowered methylene chloride content of the composition.

In addition to methylene chloride, monomethyl acid orthophosphate, and a cosolvent therefor, the finish removers of the invention may contain a number of other ingredients commonly used in compositions of this type, each of which serves a distinct and separate function. Among these additional ingredients are components generally designated as thickeners and evaporation retarders.

Finish removers which are applied by brushing or spraying, especially to vertical, inclined or underhanging surfaces, should contain a thickening agent in order to function with maximum effectiveness. In the absence of a thickener the finish remover is very fluid and drains quickly from the surface to be treated, so that there is insufficient solvent present per unit of area to penetrate the finish and loosen the bond between the same and the surface. By increasing the viscosity of the composition, the thickener prevents too-rapid draining and permits the remover to remain in contact with the surface for a sufficient time and in sufficient quantity to accomplish the desired loosening of the finish. Any material which is compatible with the other components of the finish remover formulation and which accomplishes the desired thickening can be used. Examples of typical thickeners include methyl cellulose, ethyl cellulose, bentonite, casein, and the like. Although thickeners can be used in amounts up to about 25% by weight to form a paste type of finish remover for special applications, they are commonly used in amounts of about 0.5–2% by weight of the total composition to form compositions suitable for general use.

Another usual component of modern finish remover formulations is an ingredient which retards the evaporation of the relatively volatile solvent used in the composition, thereby minimizing the costly loss thereof before the remover has had sufficient time to loosen the finish. A preferred example is paraffin wax, typically having a melting point range of from about 120° to about 135° F. The normal range of concentration of these evaporation retarders in the formulation is up to 20%, and preferably about 0.1–3% by weight of the total composition.

In order to demonstrate the effectiveness of the activator of this invention in finish remover formulations containing additional ingredients of the types discussed above, compositions similar to modern commercial finish remover formulations were prepared and tested for effectiveness in loosening commercially available surface finishes from steel panels prepared as described in connection with the data of Table I. The formulations used in the tests had the following compositions.

Formula 1: Weight percent
- Methylene chloride _____ 81.70
- Methyl alcohol _____ 10.73
- Monomethyl acid orthophosphate _____ 3.03
- Paraffin wax _____ 1.01
- Methyl cellulose _____ 1.33
- Diethylene glycol _____ 1.53
- Water _____ 0.67

100.00

Formula 2: Weight percent
- Methylene chloride _____ 83.44
- Methyl alcohol _____ 9.86
- Monomethyl acid orthophosphate _____ 3.08
- Diethylene glycol _____ 1.56
- Paraffin wax _____ 1.03
- Water _____ 1.03

100.00

Also included in these tests for purposes of comparison was a composition similar to the above, but containing no activator.

Formula 3 (control): Weight percent
- Methylene chloride _____ 91.5
- Methyl alcohol _____ 6.0
- Paraffin wax _____ 1.5
- Methyl cellulose _____ 1.0

100.0

*Table II*

| Coating | Formula 1 | | Formula 2 | | Formula 3 (Control) | |
|---|---|---|---|---|---|---|
| | Time required, min. | Area stripped, percent | Time required, min. | Area stripped, percent | Time required, min. | Area stripped, percent |
| Styrenated alkyd | 1 | 100 | 1 | 100 | 1 | 100 |
| Butadiene copolymer (water) | 20 | 100 | 15 | 100 | 25 | 95 |
| Butadiene copolymer (solvents) | 4 | 100 | 3 | 100 | 10 | 100 |
| Epoxy, not catalyzed | 2 | 100 | 1 | 100 | 2 | 100 |
| Acrylic lacquer | 1 | 100 | 1 | 100 | 1 | 100 |
| Phenolic (air dried) | 1 | 100 | 1 | 100 | 1 | 100 |
| Oxidizing alkyd | 1 | 100 | 1 | 100 | 1 | 100 |
| Oxidizing epoxy | 1 | 100 | 1 | 100 | 1 | 100 |
| Urea, oxidizing alkyd (bake 325° F.) | 23 | 100 | 10 | 100 | 30 | 0 |
| Chlorinated rubber | 1 | 100 | 1 | 100 | 1 | 100 |
| Polyvinyl acetate | 1 | 100 | 1 | 100 | 10 | 100 |
| Styrene butadiene | 20 | 100 | 2 | 100 | 60 | 85 |
| Phenolic, pigmented (air dried) | 2 | 100 | 1 | 100 | 1 | 100 |
| Phenolic (bake 200° F.) | 4 | 100 | 4 | 100 | 30 | 5 |
| Epon | 1 | 100 | 1 | 100 | 1 | 100 |
| Epon, full primer (bake 350° F.) | 3 | 100 | 5 | 100 | 30 | 0 |
| Epon, catalyzed and primer (bake 250° F.) | 6 | 100 | 8 | 100 | 30 | 25 |
| Urea, alkyd | 1 | 100 | 1 | 100 | 1 | 100 |
| Epon phenolic (2 coats baked) | 210 | 100 | 200 | 100 | 30 | 0 |
| Urea melamine (baked 350° F.) | 1 | 100 | 1 | 100 | 10 | 100 |
| Epon urea (baked 350° F.) | 5 | 100 | 12 | 100 | 60 | 0 |
| Silicone | 1 | 100 | 1 | 100 | | |
| Alkyd melamine (baked 325° F.) | 120 | 100 | 5 | 100 | 30 | 0 |
| Nitrocellulose | 1 | 100 | 1 | 100 | 60 | 0 |
| Alkyd, modified | 1 | 100 | 2 | 100 | 2 | 100 |
| Vinyl, clear (air dried) | 1 | 100 | 1 | 100 | 1 | 100 |
| Vinyl (bake 200° F.) | 1 | 100 | 2 | 100 | 1 | 100 |
| Cellulose butyrate acetate | 1 | 100 | 1 | 100 | 1 | 100 |
| Polyvinyl butyrate | 8 | 100 | 30 | 100 | 30 | 5 |

Examination of the data in Table II indicates that Formulas 1 and 2, containing monomethyl acid orthophosphate, readily stripped, in reasonable periods of time, certain surface coatings (e.g., urea-oxidizing alkyd, eponfull primer and epon urea) on which the control formulation (Formula 3) was totally ineffective, even over prolonged periods. Moreover, the addition of monomethyl acid orthophosphate to these formulations had no adverse effect on their ability to loosen other coatings (e.g., styrenated alkyd, acrylic lacquer, and oxidizing alkyd) which were also readily stripped by the control finish remover.

It is therefore apparent that this invention provides improved finish remover compositions which are effective in cases where the hitherto known removers fail, and which at the same time are just as effective as the latter for use on a wide variety of easily-removed coatings.

Although the finish remover compositions of the invention will in most cases contain a major proportion of methylene chloride, this is not necessarily always the case. Thus it is conceivable that for some special applications, the concentrations of thickener, evaporation retarder, cosolvent and monomethyl acid orthophosphate may total more than 50% of the total composition. Likewise, some other stripping agent may be used in conjunction with methylene chloride. The appended claim, however, are intended to cover those formulations in which methylene chloride is used as the principal stripping agent, i.e., in an amount greater than any other stripping agent, if any, which may also be present, regardless of whether or not the concentration of methylene chloride represents a major proportion of the total composition.

Although the invention has been described with reference to certain specific examples, these have been given by way of illustration only, and no limitation is thereby implied. Modifications and variations will be apparent to those skilled in the art.

What is claimed is:

A finish remover composition consisting essentially of methylene chloride, from about 0.1% to about 20% by weight of the total composition of monomethyl acid orthophosphate, and at least about 1% of methanol.

References Cited in the file of this patent

UNITED STATES PATENTS

| | | |
|---|---|---|
| 1,147,849 | Ellis | July 27, 1915 |
| 1,740,731 | Gravell | Dec. 24, 1929 |
| 2,375,218 | Fry et al. | May 8, 1945 |
| 2,418,138 | Packer | Apr. 1, 1947 |
| 2,507,983 | Kuentzel | May 16, 1950 |
| 2,507,985 | Kuentzel | May 16, 1950 |
| 2,704,278 | Gamrath | Mar. 15, 1955 |
| 2,852,471 | Atkins | Sept. 18, 1958 |

OTHER REFERENCES

Concise Chemical and Technical Dictionary, edited by H. Bennett, Chemical Publishing Company, Inc., 1947, page 618 relied on.

The New Methocel, pp. 17–23, pub. by Dow Chemical Co., Midland, Michigan (1949).